(12) United States Patent
Setterberg

(10) Patent No.: US 9,773,150 B1
(45) Date of Patent: Sep. 26, 2017

(54) METHOD AND SYSTEM FOR EVALUATING FINGERPRINT TEMPLATES

(71) Applicant: Fingerprint Cards AB, Göteborg (SE)

(72) Inventor: Eric Setterberg, Västra Frölunda (SE)

(73) Assignee: FINGERPRINT CARDS AB, Göteborg (SE)

( * ) Notice: Subject to any disclaimer, the term of this patent is extended or adjusted under 35 U.S.C. 154(b) by 0 days.

(21) Appl. No.: 15/444,482

(22) Filed: Feb. 28, 2017

(30) Foreign Application Priority Data

Mar. 16, 2016 (SE) ........................................ 1650354

(51) Int. Cl.
*G06K 9/00* (2006.01)
*G06K 9/52* (2006.01)

(52) U.S. Cl.
CPC ....... *G06K 9/0002* (2013.01); *G06K 9/00087* (2013.01); *G06K 9/52* (2013.01)

(58) Field of Classification Search
CPC ............... G06K 9/00006–9/0008; G06F 21/32
See application file for complete search history.

(56) References Cited

U.S. PATENT DOCUMENTS

| | | |
|---|---|---|
| 2002/0194003 A1 | 12/2002 | Mozer |
| 2003/0046237 A1 | 3/2003 | Uberti |
| 2006/0129838 A1 | 6/2006 | Chen et al. |
| 2007/0150745 A1* | 6/2007 | Peirce ..................... G06F 21/32 713/186 |
| 2008/0101658 A1* | 5/2008 | Ahern ...................... G06F 21/32 382/115 |
| 2009/0113209 A1* | 4/2009 | Lee .......................... G06F 21/32 713/186 |
| 2014/0283113 A1* | 9/2014 | Hanna ...................... G06F 21/32 726/27 |

FOREIGN PATENT DOCUMENTS

| | | |
|---|---|---|
| WO | 9846114 A2 | 10/1998 |
| WO | 2012151680 A1 | 11/2012 |

OTHER PUBLICATIONS

Swedish Search Report for Patent Application No. 1650354-2 dated Nov. 18, 2016, 2 pages.

* cited by examiner

*Primary Examiner* — Wesley Tucker
(74) *Attorney, Agent, or Firm* — RMCK Law Group, PLC

(57) ABSTRACT

A method for evaluating an individual fingerprint template by using a remote dataset, comprising the steps of capturing a fingerprint representation by a fingerprint reader on a device, extracting significant data from the captured fingerprint representation, thereby creating an individual fingerprint template for the captured fingerprint representation, transmitting the individual fingerprint template from the device to a remote dataset comprising a plurality of fingerprint templates, determining an impostor score distribution for the individual fingerprint template, determining a security threshold for the individual fingerprint template, and transmitting the determined security threshold to the device. The advantage of the invention is that an individual security threshold can be set for a user, which will improve the FAR distribution of a device.

7 Claims, 3 Drawing Sheets

METHOD AND SYSTEM FOR EVALUATING FINGERPRINT TEMPLATES

FIELD

The present invention relates to a method and system for evaluating individual fingerprint templates by using a remote dataset, preferably a cloud based dataset. By using a large number of stored templates to evaluate an actual fingerprint template, the security threshold for the actual fingerprint template can be matched and set to a predefined security level. In this way, a fingerprint template can be assigned an individually set security threshold in order to obtain an acceptable security.

BACKGROUND ART

One way of simplifying the use of various types of appliances which are protected by, for example, passwords, access codes and the like, is to replace the codes with devices which recognize the user on the basis of different physical characteristics, so called biometrics. One type of biometrical characteristic is fingerprint information, which can be used to either confirm or reject a user's attempt to gain access to an appliance, a premises, etc., referred to as user identity verification. Verification with the aid of fingerprint information is in most cases done by the user having stored his fingerprint information in the equipment in question in advance, the stored information is commonly referred to as a template. The process of extracting the template information and connecting it to a user identity is known as enrolment. The information for creating this template can either be input into the appliance which the user will later want to have access to, or via a central appliance. For systems utilizing fingerprint sensors that are significantly smaller than a typical fingerprint, the enrolment will consist of a procedure with multiple touches and the template will contain information either assembled from several smaller part-fingerprint images or will contain a plurality of separate part-fingerprint images linked together.

When the user attempts to gain access to the equipment in question, a biometric device inputs information from the user's finger and compares the input information to the template in order to decide if the user is to be granted access to the equipment or not. This comparison is referred to as fingerprint verification. To perform the verification, the input data needs to be processed into a format that can be mathematically compared with the data stored in the previously enrolled template. The method that evaluates the similarity between the input data and the template data is referred to as a matching algorithm. Typically a matching algorithm will output a match score, which e.g. may be a number between 1 and 0. A high match score will indicate a close match between input data and template data and a low match score will indicate that the input data and the template data is significantly dissimilar. In order to determine if a user is to be verified as a legitimate user, i.e. to decide if the input data and the template data is coming from the same finger or not, a security threshold is set. The security threshold is compared to the match score, and if the match score is above or equal to the security threshold, the user data is accepted and the user is verified. If the match score is below the security threshold, the user data is rejected and the user is refused access.

Equipment which verifies with the aid of fingerprint information must satisfy a number of requirements, for example reliability and speed. Verification in portable devices, for example mobile telephones, portable computers, different types of cards, etc., further requires that the equipment must be as small, lightweight and energy-efficient as possible. Another requirement is that the equipment should preferably be inexpensive. The biometric performance of a device or system is typically described with two error rates: the False Acceptance Rate (FAR) that is a measure of the systems security and the False Rejection Rate (FRR) that is a measure of the ease of use of the system. Different applications could have different preferred trade-offs between these two error rates. For some cases, convenience is more important than security and vice versa.

Known types of devices for verifying a user's identity with the aid of fingerprint information captures information from a user's fingerprint and compares this information with a template by means of the input information being combined into a representation of the fingerprint, which is then compared with the template which has been stored in advance. The capturing of fingerprint information and the matching of the fingerprint information and the template can be done in several different ways. The used method will partly depend on the size and type of the used fingerprint reader.

The security of the matching algorithm is normally determined by computing a match score distribution based on a large dataset of stored templates. By performing a very large number of match attempts using templates belonging to different fingers, an impostor score distribution can be formed. By performing a very large number of match attempts, where each match attempt uses the significant data obtained from the fingerprint information of a user and the template belonging to that user, an genuine score distribution can be formed. A security threshold for the specific matching algorithm is then set such that the security threshold will give a predefined average FAR for the complete stored dataset that gives an acceptable security. A FAR in the order of less than 0.002% or 1/50 000 may give an acceptable security level for everyday use. The corresponding FRR can be measured by performing a large number of match attempts between templates belonging to the same finger forming a distribution of genuine scores. The stored dataset is considered to represent a general public, and should comprise a large number of different templates from different persons. Normally, the stored dataset comprises several thousands of stored templates. This security threshold is determined for a specific algorithm and sensor combination at the time when the device is designed and manufactured, and is programmed into the device system. This security threshold is then used as a standard security threshold for all users of that device type.

One problem of using a predefined average security threshold based on a fixed stored dataset of templates when verifying significant data representing the fingerprint image of a user is that some templates are stronger than other templates, since individual templates differ and may e.g. resemble a normal distribution. This means that when the average security threshold is applied to a strong template, the FAR for this template will be lower than required which results in an unnecessary high FRR for the user of this template. In such a case, the significant data extracted from the fingerprint image of the user may falsely be rejected when compared to the stored template during verification. The user may have to try to verify himself several times before the significant data is accepted, which will be annoying for this user.

A strong template may be defined in the following manner: When a "normal" template is matched to a large set of impostor templates, the probability of generating a match score that is larger than the average security threshold is at the required level, for instance 1/50000. When a strong template is matched to the same large set of impostor templates, the probability of generating a match score that is larger than the average security threshold is significantly smaller than required. When a weak template is matched to the same large set of impostor templates, the probability of generating a match score that is larger than the average security threshold is significantly larger than required.

When a verification with a strong template is performed using an average security threshold, an unnecessarily high matching threshold will be applied. The usability of the system depends on the value of the matching threshold. The usability of the system will decrease when the matching threshold is increased, such that the user will be rejected more often than needed.

At the same time, a weak template using the same average security threshold may result in the FAR being too high such that the security will be lower than acceptable. In such a case, the significant data extracted from the fingerprint image of another user may falsely be accepted when compared to the stored template. This means that a device on the market using an average security threshold and having an average template will meet the security requirements, but a device having a weak template will not.

When the template is determined at the enrolment of the user at the device, the template may be given a specific score that will represent one or more numerical values for the created template. The system may use an algorithm that prompts the user to make a new enrolment if the score differs too much from a predefined numeric range or value. In this way, it may be possible to avoid templates that are too strong or too weak. However, such a system may also annoy a user and further, some fingerprints will inherently give stronger templates and some fingerprints will inherently give weaker templates.

There is thus a need for an improved way of determining a security threshold for a template representing a fingerprint image.

DISCLOSURE OF INVENTION

An object of the invention is therefore to provide an improved method for evaluating an individual fingerprint template. A further object of the invention is to provide an improved system for evaluating an individual fingerprint template.

The solution to the problem according to the invention is described in the characterizing part of claim 1 regarding the method and in claim 8 regarding the system. The other claims contain advantageous further developments of the inventive method and system. The claims also contain a computer program and a computer program product for performing such a method.

In a method for evaluating an individual fingerprint template by using a remote dataset, the steps of capturing a fingerprint representation by a fingerprint reader on a device, extracting significant data from the captured fingerprint representation, thereby creating an individual fingerprint template for the captured fingerprint representation, transmitting the individual fingerprint template from the device to a remote dataset comprising a plurality of fingerprint templates, determining an impostor score distribution for the individual fingerprint template, determining a security threshold for the individual fingerprint template, and transmitting the determined security threshold to the device are comprised.

By this first embodiment of the evaluation method according to the invention, a method is provided in which an individual security threshold level for an individual fingerprint template can be determined. In this way, the security threshold level can be determined and set individually for a fingerprint template, such that the security can be adapted to the strength of an individual fingerprint template. By determining a specific security level for an individual fingerprint template, an optimized security and usability can be obtained for each user of a device or system, even if the strength of the template differs considerably from the expected value of a normal distribution.

Known types of devices for verifying a user's identity with the aid of fingerprint information captures information from a user's fingerprint and extracts significant data from the user's fingerprint and compares this information with a template which has been stored in advance, in an enrolment stage. The capturing of fingerprint information and the matching of the fingerprint information and the template can be done in several different ways. The used method will partly depend on the size and type of the used fingerprint reader.

The security of the matching algorithm is normally set by evaluating a large dataset of stored templates. An average security threshold for the specific matching algorithm is set such that the security threshold will give a predefined average FAR for all different templates stored in the stored dataset. The stored dataset is considered to represent a general public, and should comprise a large number of different templates from different persons. Preferably, the stored dataset comprises several thousands of stored templates. This average security threshold is determined for a specific algorithm and sensor combination when the device is designed and manufactured, and this average security threshold is programmed into the device system.

One problem of using a predefined average FAR to set the security threshold for all templates of a specific device is that some templates are stronger than other templates, since individual templates differ and may e.g. resemble a normal distribution. The templates of the device are created by the combination of a specific fingerprint reader and an extraction algorithm used in that device. This means that when the average security threshold is applied to a strong template, the FAR for this template will be lower than required which results in an unnecessary high FRR for the user of this template, which may be annoying for this user. At the same time, a weak template using the same average security threshold may result in the FAR being too high such that the security will be lower than acceptable. This may not be noticed by the user but is never the less unacceptable.

When the fingerprint template is determined at the enrolment of the fingerprint, the template may be given a specific score that will represent one or more numerical values for the created template. The system may use an algorithm that prompts the user to make a new enrolment if the score differs too much from a predefined numeric range or value. In this way, it may be possible to avoid templates that are too strong or too weak. However, such a system may also annoy a user and further, some fingerprints will inherently give stronger templates and some fingerprints will inherently give weaker templates.

In an advantageous development of the method according to the invention, the remote dataset is a cloud based dataset. The cloud based dataset may comprise one or several remote servers at one or more locations. The remote dataset comprises a receiver, a transmitter and a computer for evaluating the individual fingerprint template and for determining a security threshold for the individual fingerprint template.

In an advantageous further development of the method, the method combines a plurality of different template datasets in the remote location for evaluation of the individual fingerprint template. In this way, templates of different systems which are created by a different fingerprint reader and a different extraction algorithm can be used to evaluate the individual fingerprint template. Preferably, a combination factor or combination array is applied to the different templates data sets in order to be able to combine them.

An inventive system for evaluating individual fingerprint templates by using a remote dataset comprises a fingerprint reader mounted in a device adapted for capturing a fingerprint representation, an extraction unit adapted for extracting significant data from the captured fingerprint representation and to create an individual fingerprint template for the captured fingerprint representation, transmitting means adapted for transmitting the individual fingerprint template from the device to a remote dataset comprising a plurality of fingerprint templates, determination means adapted for determining an impostor score distribution for the individual fingerprint template, determination means adapted for determining a security threshold for the individual fingerprint template, and transmitting means for forwarding the determined security threshold to the device.

By the inventive system, it is possible to determine an individual security threshold for an individual fingerprint template by using a remote dataset. In this way, it is possible to provide the same False Acceptance Rate for all different fingerprint templates used in a specific type of device. By doing this, the strength of a fingerprint template can be compensated for. A strong fingerprint template can be assigned a lower security threshold and a weaker fingerprint template can be assigned a higher security threshold. All users will in this way experience a similar False Acceptance Rate.

In a development of the system, the remote dataset is a cloud based dataset. The remote dataset may be combined from a plurality of different fingerprint template datasets, such that fingerprint templates from different types of fingerprint readers can be used, or that fingerprint templates extracted with different extraction algorithms can be used.

BRIEF DESCRIPTION OF DRAWINGS

The invention will be described in greater detail in the following, with reference to the attached drawings, in which.

MODES FOR CARRYING OUT THE INVENTION

The embodiments of the invention with further developments described in the following are to be regarded only as examples and are in no way to limit the scope of the protection provided by the patent claims.

Figure 1:
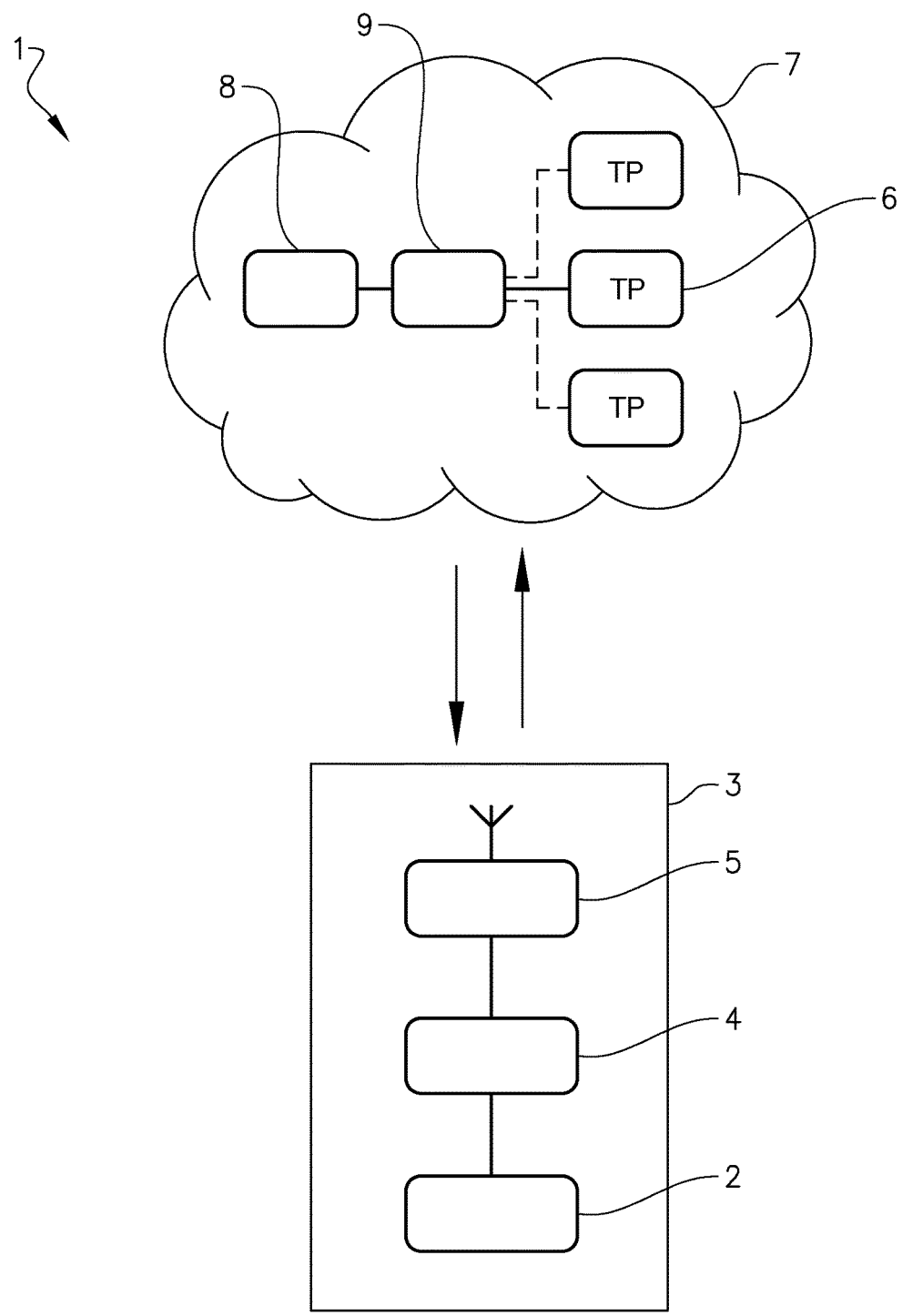
FIG. 1 shows a schematic view of a system according to the invention.

FIG. 1 shows a schematic system for evaluating individual fingerprint templates by using a remote dataset. The system 1 comprises a fingerprint reader 2 mounted in a device 3. The fingerprint reader may be a capacitive touch fingerprint reader mounted in a handheld device, such as a telephone or a tablet, but may also be e.g. an optical fingerprint reader mounted in an automated teller machine (ATM) or a door lock. Other types of fingerprint readers are also plausible. In the shown example, a capacitive touch fingerprint reader mounted in a mobile phone is used as an example. At enrolment of a user of the device, a first fingerprint representation is captured by the fingerprint reader. The fingerprint representation is used to create a template representing the fingerprint representation by extracting significant data from the fingerprint representation. For systems utilizing fingerprint sensors that are significantly smaller than a typical fingerprint, the enrolment will consist of a procedure with multiple touches and the template will contain information either assembled from several smaller part-fingerprint images or will contain a plurality of separate part-fingerprint images linked together.

The fingerprint representation may be captured in different ways. If a sufficiently large area sensor is used, a single fingerprint image will provide the fingerprint representation. If a small area sensor or touch sensor is used, which is significantly smaller than a typical fingerprint, the enrolment will consist of a procedure with multiple touches and the fingerprint representation will contain information either assembled from several smaller part-fingerprint images or will contain a plurality of separate part-fingerprint images linked together. Significant data is extracted from the fingerprint representation in order to provide a fingerprint template. If a line sensor is used, the fingerprint representation is assembled when the finger is drawn over the line sensor. An extraction unit 4 comprising an extraction algorithm is used to extract significant data from the fingerprint representation in order to create a fingerprint template of the fingerprint representation.

The created fingerprint template will have a specific strength, which is dependent on the ridge pattern of the finger of a user. Depending on the type of ridge pattern and the types of sub-groups of each ridge pattern, i.e. the different minutiae features of the finger, a stronger or weaker fingerprint template will be obtained. A more complex fingerprint having many different minutiae features may give a stronger template, while a "simpler" fingerprint having fewer distinct minutiae features may give a weaker template. The strength of the template will also depend on the extraction algorithm, e.g. on which type of significant data that is extracted from the fingerprint image.

The extracted template is transmitted to a remote dataset 6 at a remote location 7 by a transceiver 5 of the device, and is received by a transceiver 8. The remote location may be a remote data server containing a large amount of different fingerprint templates, or may comprise several different data servers at different locations, which may be referred to as a cloud based dataset. A dataset may e.g. contain all fingerprint templates created by the devices of a specific manufacturer, or all fingerprint templates of a specific service provider. The dataset will thus grow over time, giving a larger number of fingerprint templates to compare with. Other types of datasets may comprise fingerprint templates created at different temperatures or at different locations, e.g. having different humidity. By using such databases, the evaluation can compensate for environmental influences.

The remote dataset further comprises a computer 9 for evaluating the individual fingerprint template and for determining a security threshold for the individual fingerprint template. The extracted fingerprint template is stored in the dataset. The extracted fingerprint template is further compared with the stored templates in the dataset. By having a large amount of different fingerprint templates to compare with, the relative strength of the actual extracted fingerprint template can be evaluated in a more reliable way, since the remote database will contain a more representative distribution of fingerprint templates than a predefined dataset stored e.g. at the manufacturer of the device.

It is also possible to combine several different remote datasets when evaluating the extracted fingerprint template. It is e.g. possible to use datasets from different manufacturers or datasets associated with different devices. Datasets with fingerprint templates extracted from different types of fingerprint readers or with different extraction algorithms may also be combined. Preferably, a combination factor or combination array is applied to the different templates datasets in order to be able to combine them.

Figure 2:
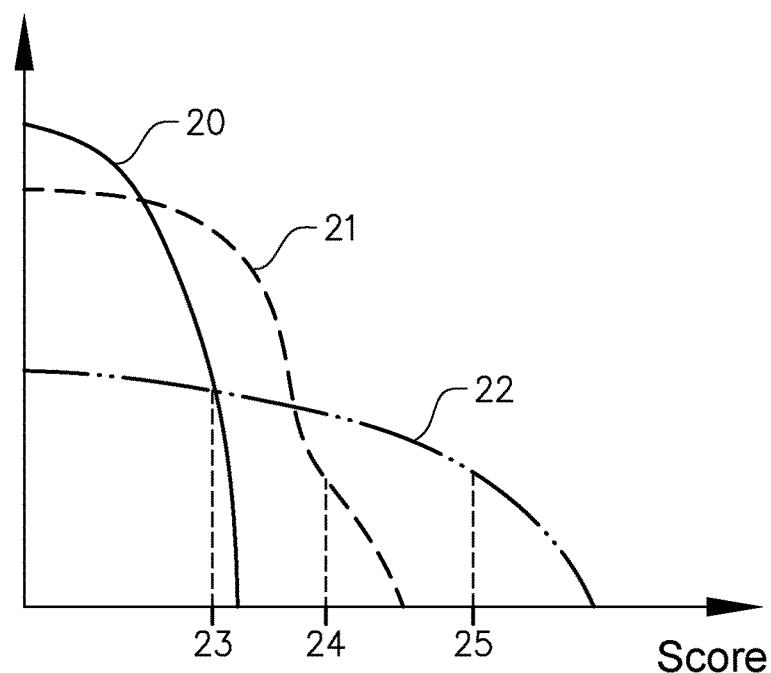
FIG. 2 shows a graph representing normalized impostor score distributions.

An average imposter score distribution is also created from the stored number of fingerprint templates. The average impostor score distribution is formed from evaluating a large number of impostor matches based on a large number of enrollments and verifications by using several different fingerprint representations with the different stored fingerprint templates. FIG. 2 shows a graph with normalized distributions, where 21 denotes an average imposter score distribution. By calculating a new impostor distribution using just the actual single fingerprint template using the stored fingerprint templates, an individual impostor score distribution is obtained. This new impostor score distribution may give a significantly different result. FIG. 2 shows a strong impostor score sub-distribution denoted 20, and a weak impostor score sub-distribution denoted 22. FIG. 2 also shows a suitable security threshold 23 for the strong impostor score sub-distribution, a suitable security threshold 24 for the average impostor score distribution, and a suitable security threshold 25 for the weak impostor score sub-distribution. It can thus be seen that if a regular security threshold is assigned to a user using a large dataset of stored templates, which is represented by threshold 24, and the template of that user is strong, the FAR is lower than required. At the same time, should the template of that user be weak, the FAR is higher than required.

When the strength of the extracted fingerprint template has been evaluated, a security threshold is determined for the fingerprint template. This security threshold is an individual security threshold assigned to the specific fingerprint template, and is preferably set such that a predefined FAR is will be reached for the extracted fingerprint template. If the fingerprint template is found to be strong, a lower security threshold such as 23 can be assigned for the extracted fingerprint template. If the fingerprint template is found to be weak, a higher security threshold such as 25 can be assigned for the extracted fingerprint template. If the fingerprint template is found to be average, an average security threshold such as 24 is assigned for the extracted fingerprint template, or an average predefined security threshold which is preinstalled in the device may be used.

Figure 4:
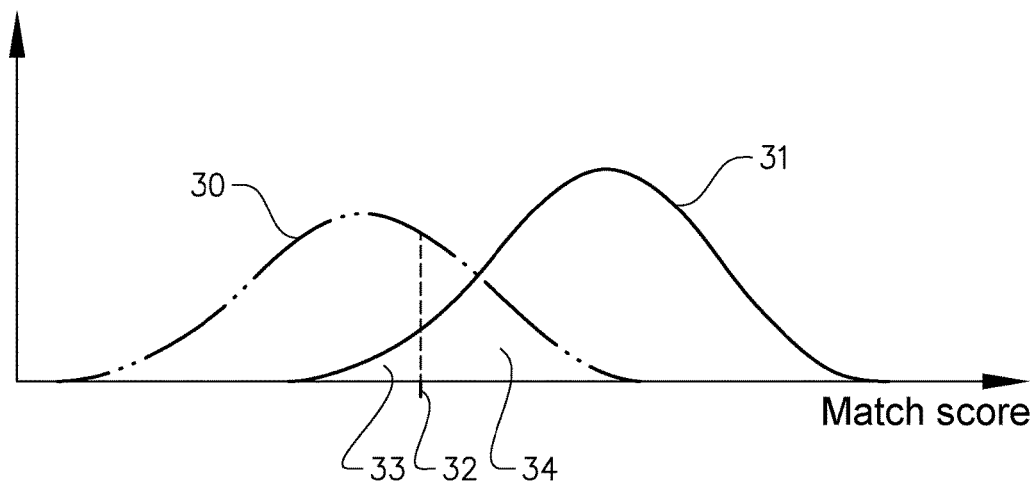
FIG. 4 shows a graph representing the relationship between impostor score distribution and template score distribution.

FIG. 4 shows a graph representing the relationship between an average impostor score distribution 30 and an average genuine score distribution 31. The two graphs overlap some, the amount of overlap depends on the strength of the used template. A security threshold 32 is assigned to the template. The FAR is represented by the area 34, which is the area below the impostor score distribution 30 to the right of the security threshold level 32. The FRR is represented by the area 33, which is the area below the genuine score distribution 31 to the left of the security threshold level 32.

Figure 3:
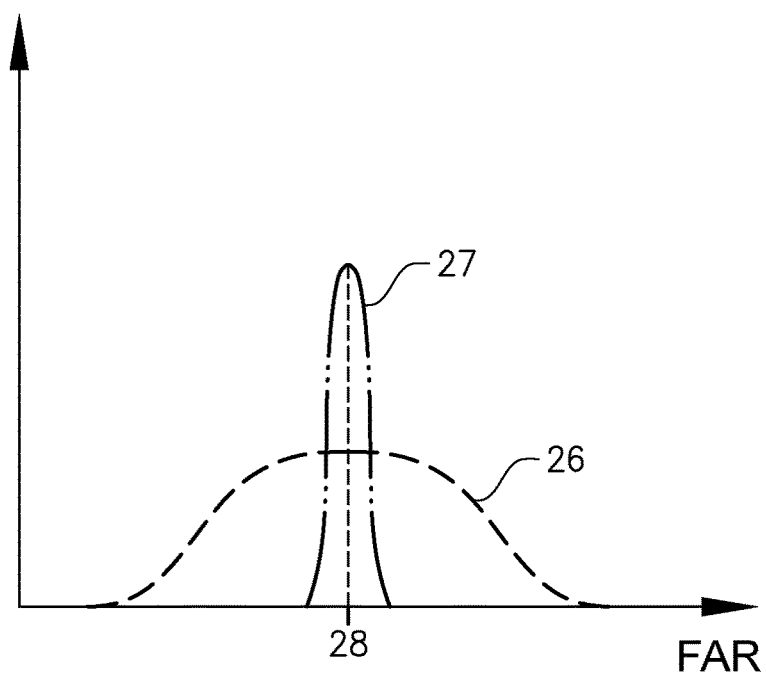
FIG. 3 shows a graph representing different FAR distributions.

By using an individual security threshold, an FAR distribution can be optimized. FIG. 3 shows a graph comprising an FAR distribution based on a large dataset of stored templates, denoted 26. The required FAR is denoted 28. By using an individual security threshold, a narrower FAR distribution denoted 27 may be obtained.

Since the different fingerprint templates will have a normal distribution, it is only the extreme fingerprint templates that need to be assigned an individual security threshold, e.g. the lower 20% and the higher 20% of the population. For the middle part of the fingerprint templates, e.g. between 20-80% of the population, an average security threshold may be acceptable. It is however possible to assign an individual security threshold to all individual fingerprint templates. Weak templates may also be removed completely or may require a new enrolment.

When an individual security threshold is determined for the extracted fingerprint template, the security threshold is transmitted to the device by the transceiver 8. The security threshold is stored in the device and will be used when the fingerprint of a user is verified by the device. This will occur every time the user activates the device and logs on to the device.

It is also possible to update an individual security threshold at a later stage, e.g. after six months, in order to improve the user experience. The reason for this may be that the remote dataset of stored templates has been updated with more templates such that an improved individual security threshold may be obtained. The specified moment to update individual security threshold can be e.g. set as a time interval or may be dependent on other program updates.

Figure 5:
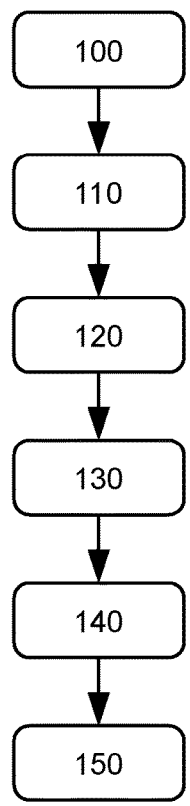
FIG. 5 shows a schematic flow chart of an inventive method according to the invention.

The inventive method for evaluating an individual fingerprint template by using a remote dataset is shown as a flow chart in FIG. 5.

In step 100, a fingerprint representation is captured a by a fingerprint reader mounted in a device. In step 110, significant data is extracted from the captured fingerprint representation, thereby creating an individual fingerprint template for the captured fingerprint representation.

In step 120, the individual fingerprint template is transmitted from the device to a remote dataset at a remote location. In step 130, an impostor score distribution is determined for the individual fingerprint template.

In step 140, a security threshold is determined for the individual fingerprint template in order to provide a predefined False Acceptance Rate. In step 150, the determined security threshold is transmitted to the device, where it is stored in a memory. The stored security threshold will be used for verification of a user by comparing a captured fingerprint image with the stored fingerprint template and applying the security threshold.

The invention is not to be regarded as being limited to the embodiments described above, a number of additional variants and modifications being possible within the scope of the subsequent patent claims.

REFERENCE SIGNS

1: System
2: Fingerprint reader
3: Device
4: Extracting unit

5: Transceiver
6: Dataset
7: Remote location
8: Transceiver
9: Computer
20: Strong impostor score sub-distribution
21: Average imposter score distribution
22: Weak impostor score sub-distribution
23: Threshold for strong impostor score sub-distribution
24: Threshold for average impostor score distribution
25: Threshold for weak impostor score sub-distribution
26: Regular FAR distribution
27: Narrow FAR distribution
28: Required FAR
30: Average imposter score distribution
31: Average genuine score distribution
32: Security threshold
33: FRR
34: FAR

What is claimed is:

1. A method for evaluating an individual fingerprint template by using a remote dataset, comprising the following steps:
   capturing a fingerprint representation by a fingerprint reader on a device,
   extracting significant data from the captured fingerprint representation, thereby creating an individual fingerprint template for the captured fingerprint representation,
   transmitting the individual fingerprint template from the device to a remote dataset comprising a plurality of fingerprint templates,
   determining an individual impostor score distribution for the individual fingerprint template by using the remote dataset of fingerprint templates,
   determining a security threshold for the individual fingerprint template in order to provide a predefined False Acceptance Rate for the extracted fingerprint template, and
   transmitting the determined security threshold to the device,
   wherein the method further comprises the step of repeating the steps of:
   transmitting the individual fingerprint template from the device to the remote dataset comprising the plurality of fingerprint templates, determining the impostor score distribution for the individual fingerprint template, determining the security threshold for the individual fingerprint template in order to provide the predefined False Acceptance Rate, and transmitting the determined security threshold to the device, where these steps are performed separately at a specified time interval.

2. The method according to claim 1, wherein the remote dataset is a cloud based dataset.

3. The method according to claim 1, wherein the specified time interval is initiated by an external signal.

4. The method according to claim 1, wherein the method further comprises the step of combining a plurality of different template datasets in the cloud for the evaluation of the False Acceptance Rate of the individual fingerprint template.

5. The method according to claim 1, wherein the determined security threshold for the individual fingerprint template depends on the strength of the individual fingerprint template.

6. The method according to claim 1, wherein the strength of the fingerprint template is assigned a numeric value or an array of numeric values.

7. A non-transitory computer-readable storage medium storing instructions that, when executed by one or more processors, cause the one or more processors to perform the method of claim 1.

* * * * *